(12) United States Patent
Christensen et al.

(10) Patent No.: US 9,141,996 B2
(45) Date of Patent: Sep. 22, 2015

(54) DYNAMIC AUTO INSURANCE POLICY QUOTE CREATION BASED ON TRACKED USER DATA

(71) Applicant: STATE FARM MUTUAL AUTOMOBILE INSURANCE COMPANY, Bloomington, IL (US)

(72) Inventors: Scott T. Christensen, Gibson City, IL (US); Gregory Hayward, Bloomington, IL (US); Christopher E. Gay, Dallas, TX (US); Steven Cielocha, Bloomington, IL (US); Todd Binion, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 14/203,338

(22) Filed: Mar. 10, 2014

(65) Prior Publication Data

US 2014/0257871 A1    Sep. 11, 2014

Related U.S. Application Data

(60) Provisional application No. 61/775,652, filed on Mar. 10, 2013.

(51) Int. Cl.
| | |
|---|---|
| *G06Q 40/00* | (2012.01) |
| *B60Q 1/00* | (2006.01) |
| *G01M 17/00* | (2006.01) |
| *G06F 7/00* | (2006.01) |
| *G06F 11/30* | (2006.01) |
| *G06F 19/00* | (2011.01) |
| *G07C 5/00* | (2006.01) |
| *G06Q 40/08* | (2012.01) |

(52) U.S. Cl.
CPC ........ *G06Q 40/08* (2013.01); *B60Q 1/00* (2013.01); *G06Q 40/00* (2013.01); *G07C 5/00* (2013.01); *G07C 5/008* (2013.01)

(58) Field of Classification Search
None
See application file for complete search history.

(56) References Cited

U.S. PATENT DOCUMENTS

| | | | |
|---|---|---|---|
| 5,499,182 A | 3/1996 | Ousborne | |
| 5,797,134 A | 8/1998 | McMillan et al. | |
| 6,064,970 A | 5/2000 | McMillan et al. | |
| 6,434,510 B1 * | 8/2002 | Callaghan | 702/165 |
| 6,856,933 B1 * | 2/2005 | Callaghan | 702/149 |
| 6,868,386 B1 | 3/2005 | Henderson et al. | |
| 7,343,306 B1 * | 3/2008 | Bates et al. | 705/4 |
| 7,890,355 B2 * | 2/2011 | Gay et al. | 705/4 |
| 8,140,358 B1 | 3/2012 | Ling et al. | |
| 8,332,242 B1 | 12/2012 | Medina, III | |
| 8,489,433 B2 | 7/2013 | Altieri et al. | |
| 8,508,353 B2 | 8/2013 | Cook et al. | |
| 8,538,789 B1 * | 9/2013 | Blank et al. | 705/7.11 |
| 8,566,126 B1 | 10/2013 | Hopkins, III | |

(Continued)

*Primary Examiner* — Gregory Johnson
(74) *Attorney, Agent, or Firm* — Marshall, Gerstein & Borun LLP; Randall G. Rueth

(57) ABSTRACT

A system and method may create auto insurance quotes using data collected from a device that tracks vehicle usage data and other data. Usage data may be tracked by an On Board Diagnostic (OBD) device or other portable computing device such as a smart phone. Based on a received coverage type, the usage data and other data may be analyzed to determine auto insurance quotes. A potential customer may then purchase an auto insurance policy. Once the purchased policy has been determined to have expired, new usage data will be collected, and new quotes will be created for the customer.

27 Claims, 6 Drawing Sheets

(56) References Cited

U.S. PATENT DOCUMENTS

| | | | |
|---|---|---|---|
| 8,606,512 B1 | 12/2013 | Bogovich et al. | |
| 8,606,514 B2 | 12/2013 | Rowley et al. | |
| 8,630,768 B2 | 1/2014 | McClellan et al. | |
| 8,635,091 B2* | 1/2014 | Amigo et al. | 705/4 |
| 8,655,544 B2* | 2/2014 | Fletcher et al. | 701/32.5 |
| 8,682,699 B2 | 3/2014 | Collins et al. | |
| 8,725,408 B2 | 5/2014 | Hochkirchen et al. | |
| 9,008,956 B2* | 4/2015 | Hyde et al. | 701/123 |
| 2002/0026394 A1* | 2/2002 | Savage et al. | 705/34 |
| 2002/0111725 A1* | 8/2002 | Burge | 701/29 |
| 2002/0198843 A1* | 12/2002 | Wang et al. | 705/51 |
| 2003/0191581 A1 | 10/2003 | Ukai et al. | |
| 2004/0117358 A1* | 6/2004 | von Kaenel et al. | 707/3 |
| 2004/0153362 A1 | 8/2004 | Bauer et al. | |
| 2005/0283388 A1* | 12/2005 | Eberwine et al. | 705/4 |
| 2006/0075120 A1* | 4/2006 | Smit | 709/227 |
| 2006/0247852 A1 | 11/2006 | Kortge et al. | |
| 2007/0106539 A1* | 5/2007 | Gay | 705/4 |
| 2007/0124045 A1* | 5/2007 | Ayoub et al. | 701/36 |
| 2008/0051996 A1* | 2/2008 | Dunning et al. | 701/211 |
| 2008/0255888 A1* | 10/2008 | Berkobin et al. | 705/4 |
| 2009/0024419 A1 | 1/2009 | McClellan et al. | |
| 2010/0030568 A1* | 2/2010 | Daman | 705/1 |
| 2010/0066513 A1 | 3/2010 | Bauchot et al. | |
| 2010/0131304 A1 | 5/2010 | Collopy et al. | |
| 2010/0138244 A1* | 6/2010 | Basir | 705/4 |
| 2010/0185534 A1* | 7/2010 | Satyavolu et al. | 705/30 |
| 2010/0238009 A1 | 9/2010 | Cook et al. | |
| 2011/0153367 A1* | 6/2011 | Amigo et al. | 705/4 |
| 2011/0161117 A1* | 6/2011 | Busque et al. | 705/4 |
| 2011/0161118 A1* | 6/2011 | Borden et al. | 705/4 |
| 2011/0200052 A1* | 8/2011 | Mungo et al. | 370/401 |
| 2012/0004933 A1 | 1/2012 | Foladare et al. | |
| 2012/0072243 A1* | 3/2012 | Collins et al. | 705/4 |
| 2012/0072244 A1* | 3/2012 | Collins et al. | 705/4 |
| 2012/0101855 A1* | 4/2012 | Collins et al. | 705/4 |
| 2012/0109418 A1 | 5/2012 | Lorber | |
| 2012/0109692 A1* | 5/2012 | Collins et al. | 705/4 |
| 2012/0158436 A1 | 6/2012 | Bauer et al. | |
| 2012/0197669 A1 | 8/2012 | Kote et al. | |
| 2012/0209632 A1 | 8/2012 | Kaminski et al. | |
| 2012/0209634 A1 | 8/2012 | Ling et al. | |
| 2012/0214472 A1 | 8/2012 | Tadayon et al. | |
| 2012/0323772 A1* | 12/2012 | Michael | 705/39 |
| 2013/0013347 A1 | 1/2013 | Ling et al. | |
| 2013/0013348 A1 | 1/2013 | Ling et al. | |
| 2013/0046646 A1* | 2/2013 | Malan | 705/26.2 |
| 2013/0110310 A1* | 5/2013 | Young | 701/1 |
| 2013/0144657 A1* | 6/2013 | Ricci | 705/4 |
| 2013/0166326 A1 | 6/2013 | Lavie et al. | |
| 2013/0289819 A1 | 10/2013 | Hassib et al. | |
| 2013/0304276 A1* | 11/2013 | Flies | 701/1 |
| 2013/0304515 A1 | 11/2013 | Gryan et al. | |
| 2014/0108058 A1* | 4/2014 | Bourne et al. | 705/4 |
| 2014/0114696 A1* | 4/2014 | Amigo et al. | 705/4 |
| 2014/0257867 A1* | 9/2014 | Gay et al. | 705/4 |
| 2014/0257871 A1* | 9/2014 | Christensen et al. | 705/4 |
| 2014/0278574 A1* | 9/2014 | Barber | 705/4 |

* cited by examiner

300

Allow system to begin tracking
usage data    ◉ Yes  ◉ No    ─ 301

Coverage Type    [Select Coverage Type ▼]  ─ 302

Cancel Tracking

─ 303
☐ I Understand Terms and Conditions    [Confirm]

FIG. 3

DYNAMIC AUTO INSURANCE POLICY QUOTE CREATION BASED ON TRACKED USER DATA

CROSS-REFERENCE TO RELATED APPLICATIONS

This application claims the benefit of U.S. Provisional Application No. 61/775,652, filed Mar. 10, 2013, which is incorporated by reference herein.

FIELD OF THE DISCLOSURE

This disclosure relates to a system and method for measuring risk to create an insurance policy quote based at least in part on tracked user data and other information.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Auto insurance policy rates may be calculated based on a determined risk for the possibility of a claim against the insurance company under the policy. Determining that risk, however, may be difficult. Typically, insurance companies use a number of factors related to the customer, the property to be insured, and environmental factors (e.g., the geographic area the property is located in and the likelihood of claims in that area). However, accurately determining these factors and, thus, determining an accurate measure of risk for a claim, is difficult because the factors are most often reported to the insurance company by the party most likely to benefit under a claim: the customer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Customers may have urgent needs for short or long term auto insurance policies. Traditional methods of purchasing auto insurance may take too much time to complete, and may not provide the customer with the desired coverage term. A dynamic policy module may provide quick and personalized auto insurance options to a potential customer by accurately and quickly communicating possible risk factors to the insurance provider. Additionally, the module may track usage data of a potential customer to provide more accurate policy quotes, audits, and renewals.

For example, a computer-implemented method may provide for display, a selectable option to track usage data corresponding to a potential customer. In response to receiving a selection to track the usage data, the method may implement a vehicle's On Board Diagnostic (OBD) device to track usage, or alternatively, the method may track usage via a portable computing device such as a smart phone. The method may track usage of one or more vehicles associated with a potential customer. Usage data which is useful for calculating insurance policy quotes may include mileage data, speed data, time data, driving characteristics, etc. The method may then receive all usage data and other data associated with a potential customer, along with a selected coverage type. The method may then analyze the usage and other data, and based on the coverage type, determine price quotes for various insurance policies. The method may then receive a purchase transaction, and continue to track usage until the policy has been determined to expire. The method may then reanalyze the data and create new policy quotes for the potential customer.

In other embodiments, a computer device may track usage data corresponding to a potential customer, and in turn create insurance policy quotes for said potential customer. The computer device may comprise one or more processors and one or more memories coupled to the one or more processors. The one or more memories may include computer executable instructions stored therein that, when executed by the one or more processors, cause the one or more processors to perform a plurality of functions. For example, the functions may cause an On Board Diagnostic (OBD) device to track usage, or alternatively, the functions may track usage via a portable computing device such as a smart phone. The functions may then cause the one or more processors to track usage of one or more vehicles associated with a potential customer. Usage data which is useful for calculating insurance policy quotes may include mileage data, speed data, time data, driving characteristics, etc. The functions may then cause the one or more processors to receive all usage data and other data associated with a potential customer, along with a selected coverage type. The functions may then cause the one or more processors to analyze the usage and other data, and based on the coverage type, determine price quotes for various insurance policies. The functions may then cause the one or more processors to receive a purchase transaction, and continue to track usage until the policy has been determined to expire. Finally, the functions may then cause the one or more processors to then reanalyze the data and create new policy quotes for the potential customer.

In still other embodiments, a tangible computer-readable medium may include non-transitory computer readable instructions stored thereon to track usage data corresponding to a potential customer, and in turn create insurance policy quotes for said potential customer. For example, the instructions may cause an On Board Diagnostic (OBD) system to track usage, or alternatively, the instructions may track usage via a portable computing device such as a smart phone. The instructions may then comprise tracking usage of one or more vehicles associated with a potential customer. Usage data which is useful for calculating insurance policy quotes may include mileage data, speed data, time data, driving characteristics, etc. The instructions may then comprise receiving all usage data and other data associated with a potential customer, along with a selected coverage type. The instructions may then comprise analyzing the usage and other data, and based on one or more coverage types, determining price quotes for various insurance policies. The instructions may then comprise receiving a purchase transaction, and continuing to track usage until the policy has been determined to expire. Finally, the instructions may then comprise reanalyzing the data and creating new policy quotes for the potential customer.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 3 is an illustration of an example user interface for permitting tracking and selecting a coverage type;

The figures depict embodiments of the present invention for purposes of illustration only. One skilled in the art will readily recognize from the following discussion that alternate embodiments of the structures and methods illustrated herein may be employed without departing from the principles of the invention described herein.

DETAILED DESCRIPTION

Figure 1:
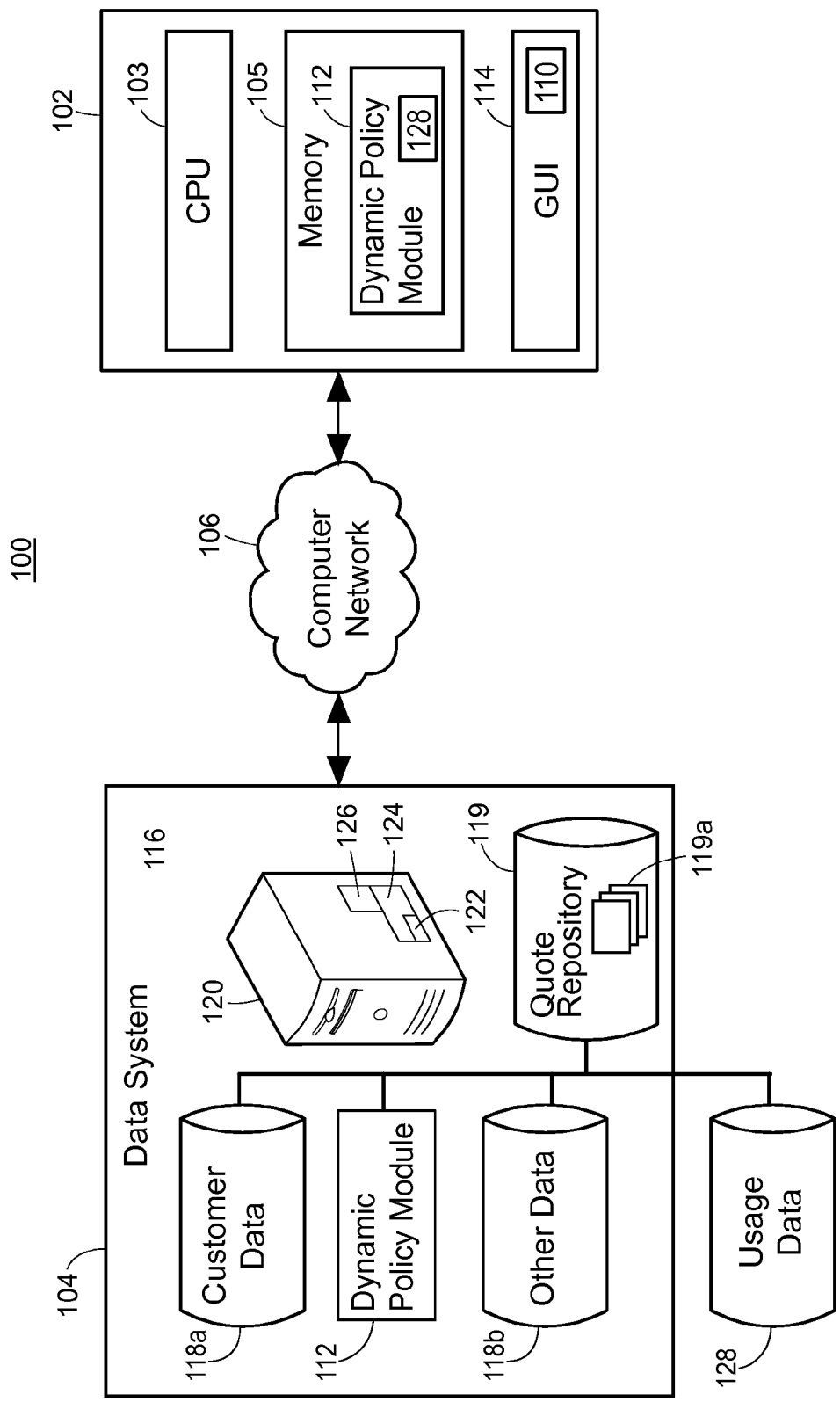
FIG. 1 is a simplified and exemplary block diagram of a system for dynamic insurance policy quote creation based on tracked usage data.

FIG. 1 generally illustrates one embodiment for a system 100 to create and present an auto insurance policy to a potential customer using tracked usage data. The system 100 may include a client 102 as a front end component and backend components 104 in communication with each other via a communication link 106 (e.g., computer network, internet connection, etc.). FIG. 1 illustrates a block diagram of a high-level architecture of dynamic auto insurance policy creation and presentation system 100 including various software or computer-executable instructions and hardware components or modules that may employ the software and instructions to create insurance policies based on tracked usage data. The various modules may be implemented as computer-readable storage memories containing computer-readable instructions (i.e., software) for execution by a processor of the computer system 100. The modules may perform the various tasks associated with creating and presenting auto insurance policies and tracking vehicle usage data, as herein described. The computer system 100 also includes both hardware and software applications, as well as various data communications channels for communicating data between the various hardware and software components.

The client 102 may track vehicle usage data and communicate collected data to the backend components 104 to complete insurance policy creation and presentation. For example, the client 102 may be a computing device including a CPU 103 and one or more computer readable memories 105. The client 102 may be capable of executing a graphical user interface (GUI) 110 for a dynamic policy module 112 within a web browser 114. In some embodiments, the client 102 executes instructions of a network-based data system 116 to receive potential customer data 118a, other data 118b, and usage data 128 via the computer network 106 for display in the GUI 110. The backend components 104 may receive the data 118a, 118b, 128 from the client 102 via the computer network 106 upon execution of a dynamic policy module 112 by a system processor.

The dynamic policy module 112 may create auto insurance quotes 119a and cause the quotes 119a to be stored in a quote data repository 119. Generally, each quote 119a is a data structure defining coverage and conditions for an insurance policy between the insurance company and a potential customer, where the data structure includes a plurality of data to be presented to the user.

The client 102 may be a smart phone, tablet computer, On Board Diagnostic device, key fob device (OBD) or other suitable computing device. While only one client 102 is illustrated in FIG. 1 to simplify and clarify the description, it will be understood that any number of client devices are supported and may be in communication with the backend components 104. Further, while only one CPU 103, Memory 105, and GUI 114 is illustrated in the client 102, the client 102 may support any number of these components.

The client may contain a GUI 110 which may communicate with the system 116 through the Internet 106 or other type of suitable network (local area network (LAN), a metropolitan area network (MAN), a wide area network (WAN), a mobile, a wired or wireless network, a private network, a virtual private network, etc.). A system server 120 may send and receive information and data 118a, 118b, 128 for the system 100 such as computer-executable instructions and data associated with applications executing on the client 102 (e.g., the dynamic policy module 112). The applications executing within the system 100 may include cloud-based applications, web-based interfaces to the data system 116, software applications executing on the client 102, or applications including instructions that are executed and/or stored within any component of the system 100. The applications, GUI 110, browser 114, and module 112 may be stored in various locations including separate repositories and physical locations.

In some embodiments, the data system 116 in general and the server 120 in particular may include computer-executable instructions 122 stored within a memory 124 of the server 120 and executed using a processor 126. The instructions 122 may instantiate a policy creation tool 112 or send instructions to the client 102 to instantiate a GUI 110 for the tool 112 using a web browser application 114 of a client 102. In some embodiments, the browser application 114, GUI 110, dynamic policy module 112, and elements of the data system 116 may be implemented at least partially on the server 120 or the client 102. The data system 116 and processor 126 may execute instructions 122 to display the GUI 110 including the data 118a, 118b, 128 within a display of the client 102 or server 120 (not shown).

The dynamic policy module 112 may include usage data 128 gained through tracking vehicle usage and other information. The dynamic policy module 112 may identify a vehicle based on the Vehicle Identification Number (VIN), stored in the potential customer data 118a. The system 100 may receive the usage data 128 through an on-line environment (e.g., the client 102) and web-based user interface, as further described herein. The system 100 may also receive additional usage data 128 from potential customer data 118a, other data 118b, or historical data 118c when appropriate.

The dynamic policy module 112 may include various instructions for execution by a processor 126 to create policy quotes. For example, the module 112 may create quotes 119a by analyzing the usage data 128 collected by the client 102, along with data from the database 118a, 118b, 128. The module 112 may tailor the policy based on a received coverage type (e.g., selected by a potential customer or automatically when a policy quote 119a is created). Further, the module 112 may track different usage statistics based on the selected coverage type. In one embodiment, the potential customer can choose what usage data to share with the insurance company for purposes of calculating the quote.

The dynamic policy module 112 may then present the one or more created quotes 119a. In response to presenting the one or more created quotes 119a, the module may receive an indication of a policy purchase. Upon receiving a purchased policy from the one or more quotes presented, the module 112 may continue to track usage statistics until the purchased policy expires. At the time of the purchased policy expiration, the module 112 may collect new usage data and create new quotes for the user.

Figure 2:
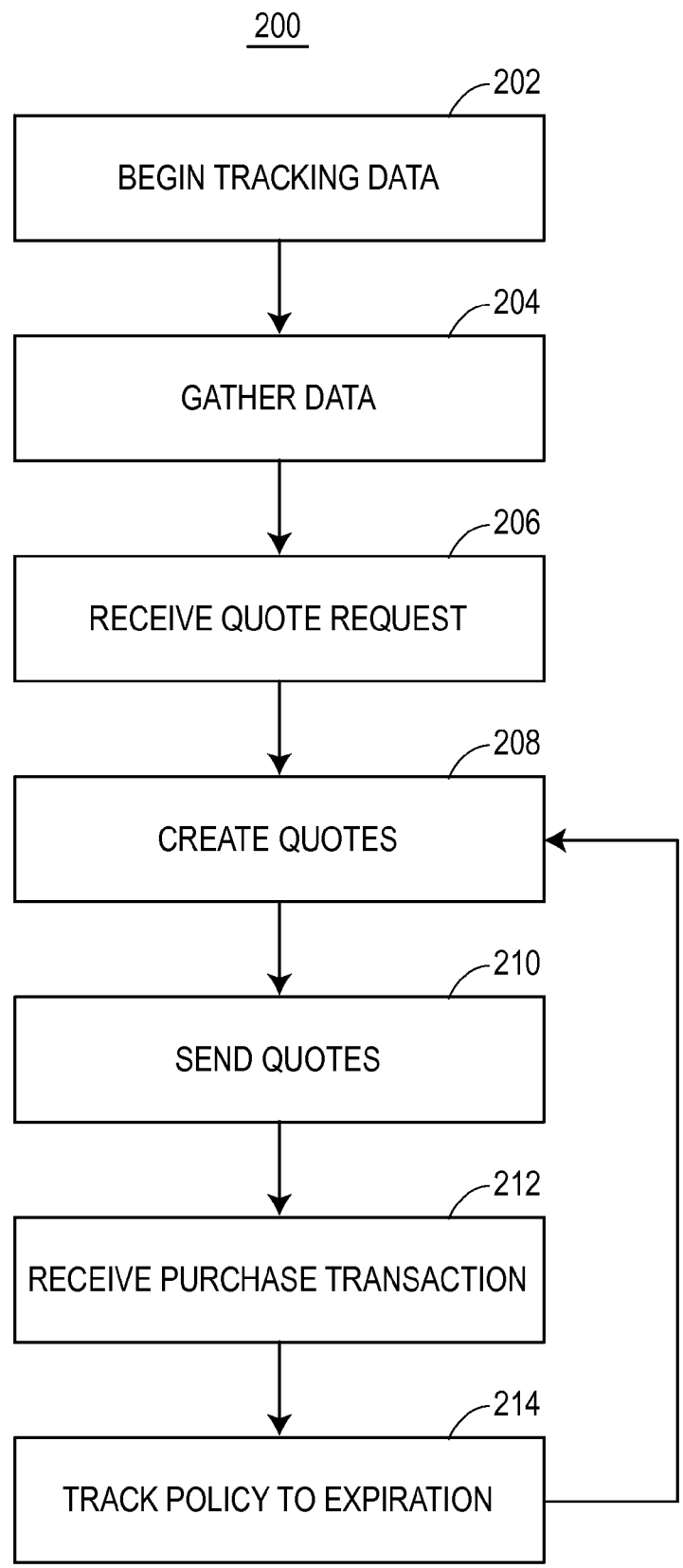
FIG. 2 is a flow chart illustrating an exemplary method for a dynamic insurance policy quote creation based on tracked usage data.

With reference to FIG. 2, the system 100 described herein may be employed in a method 200 to track usage data and create and present insurance quotes to a user. The method 200 may include one or more functions or routines in the form of non-transitory computer-executable instructions that are stored in a tangible computer-readable storage medium and executed using a processor of a computing device (e.g., the client 102, the server 120, or any combination of computing devices within the system 100). The routines may be included as part of any of the modules described in relation to FIG. 1 above, or FIG. 5, below, or as part of a module that is external to the system illustrated by FIGS. 1 and 5. For example, the method 200 may be part of a browser application or another application running on the client 102 as a plugin or other module of the browser application. Further, the method 200 may be employed as "software-as-a-service" to provide a client 102 with access to the data system.

At function 201, the system 100 may execute an instruction to begin tracking usage data, as described above in relation to FIG. 1 (e.g., via a client device 102). The function 201 may include an instruction requiring receipt of data indicating that the user has provided consent before usage data is tracked. In another embodiment, the system receives an indication that an OBD device is installed and activated by the potential customer for tracking to begin. In still another embodiment, the system 100 receives data indicating that a smart phone or other portable computing device is configured to begin tracking usage data.

With reference to FIG. 3, an example user interface for permitting tracking 301 and selecting a coverage type 302 may allow the system 100 to receive permission to begin tracking. Further, the example interface 300 may allow the system to receive one or more coverage types. Receiving the coverage type 302 may, in turn, dictate which usage data the dynamic policy module 112 tracks. The interface 300 may also allow the system to receive instructions to stop tracking 303 usage data 128. The interface 300 may be viewed on a client device 102, through a web browser 110 on a GUI 114.

Figure 1A:
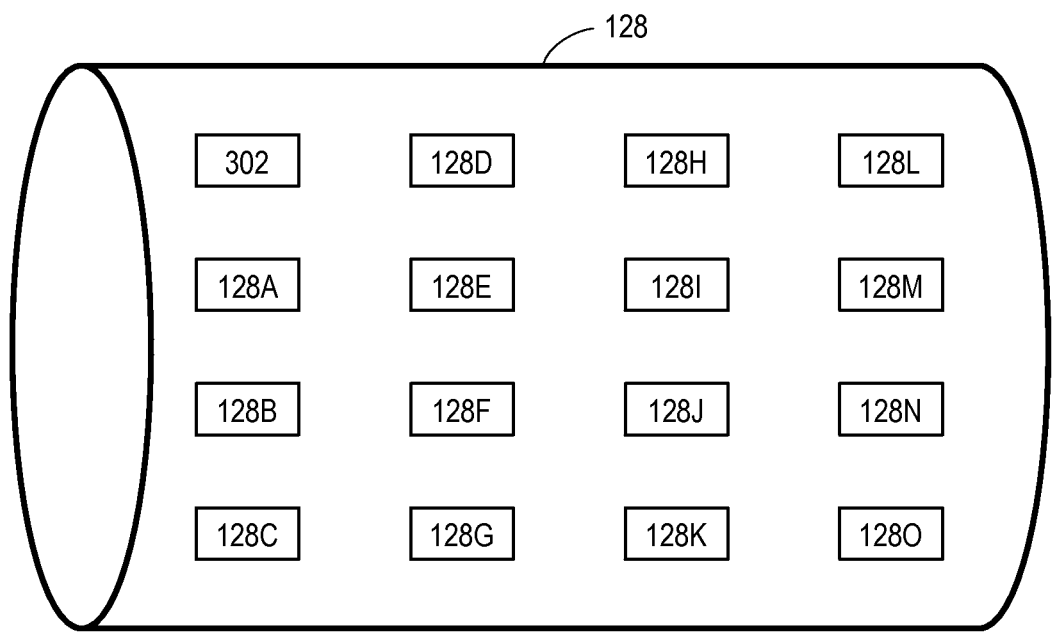
FIG. 1A is an exemplary data structure including usage data.

Once the system receives data indicating permission, the module 112, via the client 102, may begin tracking usage data 128 at function 204 of method 200. Referring now the FIG. 1A, a usage database 128 may store a plurality of data structures. In one embodiment, an On Board Diagnostic (OBD) devices may track usage data 128. The OBD device is a computing device installed in the diagnostic port of a vehicle. In an embodiment, one or more OBD devices can be configured to track usage data 128 across one or more vehicles associated with a user. The OBD device may track usage data 128 such as the number of times a vehicle is turned on and off 128A, distance traveled 128B, number of times a person enters or exits the vehicle 128C, total elapsed time the vehicle is on 128D (including drive time and idle time), etc. The OBD device may further be coupled with other sensors, which may enable the OBD device to track the number of times a vehicle enters and exits a particular location 128E, such as a parking garage.

The OBD device may further track the average speed 128F and the top speed 128G of the vehicle. In an embodiment the OBD device may have access to a Global Positioning System (GPS). The OBD device may then locate the vehicle's location 128H using the GPS which can be used to access local speed limits. The OBD device may then compare the vehicle speed to the local speed limit to determine if the vehicle is being driven in a safe manner 128I. The vehicle location 128H may also be used to track travel routes 128J. The travel routes 128J may be cross referenced with crime stats 128K, accident reports 128L and other statistics which may affect policy quotes 119a.

The OBD device may also monitor other factors such as the hours of the day which the vehicle is used 128M, the number of turns a vehicle makes 128N, the average miles per gallon (MPG) the vehicle achieves 128O, and other usage data. Depending on the coverage type, all or a selection of the statistics may be used to determine an insurance policy quote for a user. For example, if a received coverage type 302 is liability insurance, the module 112 may not track average MPG the vehicle achieves 128O, since this data does not directly correlate with the likelihood of an accident.

In another embodiment, the usage data 128 may be tracked by a smart phone or other mobile computing device such as a GPS or tablet computer. The device may be configured to communicate with sensors in a vehicle by a wired or wireless (e.g., Bluetooth) connection. Once the device communicates with a sensor, the device may determine when to begin tracking usage data 128. The device may also be able to receive data from the vehicle such as odometer readings 128B, travel times (128D, 128M), speed (128F, 128G) and mileage statistics (128O), and other data. The device may be able to track usage data 128 as described above with regard to the OBD device. In further embodiments, the dynamic policy module 112 executing on a smart phone or other mobile computing device may prompt a user to photograph the odometer of the vehicle. For example, the module 112 may execute an instruction to prompt the user at periodic intervals to take a photo of the odometer and the module may further execute an instruction to send the photo to the server 102 for analysis or may analyze the photo at the mobile computing device to determine a set of numbers from the photo, where the numbers indicate a mileage of the vehicle.

Each data structure of the tracked usage data 128 may influence the policy quotes 119a. For example, the total elapsed time the vehicle is on 128D may directly affect the quote. Generally, users with vehicles that operate for less time generally pay a lower amount for auto insurance, all other factors being equal. In one implementation, an in-vehicle mounted device such as Auterra's DashDyno SPD may be used to collect data on total elapsed time the vehicle was in use 128D. DashDyno connects to the vehicle's OBD system and may be used to collect data on different vehicle parameters including drive time (i.e., engine running time) and time since engine start. A "publish and subscribe" protocol of the dynamic policy module 112 may be used to automatically download the data from the localized sensor device to the mobile device for transmitting vehicle usage data to the server 120. In another implementation, the localized sensor device may be installed in the user's vehicle after the insurance purchase transaction. For example, the device would be mailed to the potential customer along with policy details.

Further, the vehicle may be determined to be in use 128D by a vibration sensor. In an embodiment, a vibration sensor may detect the motion of the vehicle, and thus determine that the vehicle is in use. In another embodiment, a light sensor may be used to determine that a vehicle is in use 128D. A light sensor may detect changes in light patterns as the vehicle is in motion. In still another embodiment, an audio sensor may be used to determine that the vehicle is in use. An audio sensor may detect engine sounds to determine that a vehicle is in use. These sensors (vibration, light, and sound) may then record and transmit data on the length of time a vehicle is in use 128D.

In another implementation, the number of turns a vehicle makes 128N may affect the quote 119a. In an example, turns 128N may be counted by the number of times a steering wheel is turned past a minimum threshold of X degrees. The number of turns 128N may, for example, be monitored using a proximity sensor and a wheel covering. Further, the sensor may be decoupled from a communication device. In another example, the sensor may be coupled to a communication device.

Similarly, the number of times a user enters and exits the vehicle 128C may affect the quote 119a. The number of times a user enters and exits the vehicle 128C may be tracked, in one example, by the user's key fob for the vehicle. The key fob may include a sensor that counts the number of times a user enters, exits, and/or starts the vehicle. The key fob may also include a time-of day sensor to "timestamp" the time of day the vehicle is used 128M.

The number of times a vehicle enters or exits a particular location 128E, such as a garage, may affect the quote 119a. In one example, a sensor positioned in proximity to a vehicle parking place such as a garage door, near a reserved parking spot, or at the threshold of a driveway may be used to count the number of times the vehicle is moved from the location 128E. In one implementation the sensor may be decoupled from a communication device, while in another implementation the sensor may be coupled to a communication device. The sensor may a device such as a magnetic sensor, an electric sensor, a light sensor, an infrared sensor, etc.

Further, distance traveled 128B may affect the quote 119a. Distance traveled 119a may be tracked using GPS technology. In another embodiment, distance traveled 128B may be tracked using off-premises field surveying of a vehicle. In still another embodiment, distance traveled 128B may be tracked using a plurality of sensor devices distributed within a geographical area. In still another embodiment, distance traveled 128B may be tracked using aerial imagery of the vehicle.

The dynamic policy module 112, via the client 102, may continue to track usage data 128 until tracking is cancelled or until a quote request is received at the server at function 206. The dynamic policy module 112 may then determine a risk score for the potential customer and correlate that determined score to a price for an insurance policy based on the coverage type received by function 202, or for a new coverage type received along with the quote request.

The module 112 may be able to create quotes for auto insurance policies of many different coverage types. For example, a module 112 may create quotes for auto insurance policies with variable time lengths. These policies may be based on the needs of a user and can last a duration of hours, days, weeks or months. In another implementation, a coverage type may be based on a distance. The policy may be based on a user's needs and cover both short and long distances.

At function 208, the dynamic policy module 112 may create an auto insurance quote using the gathered data of function 204. The module 112 may receive usage data 128, potential customer data 118a, other data 118b, and historical data 118c. The module 112 may then calculate, using the received data, one or more auto insurance quotes based on the received coverage type. Each policy 119a, created by the module 112, may be stored in the policy data repository 119 before being communicated to the client device 102 via the network 106 and presented within a user interface.

Figure 4:
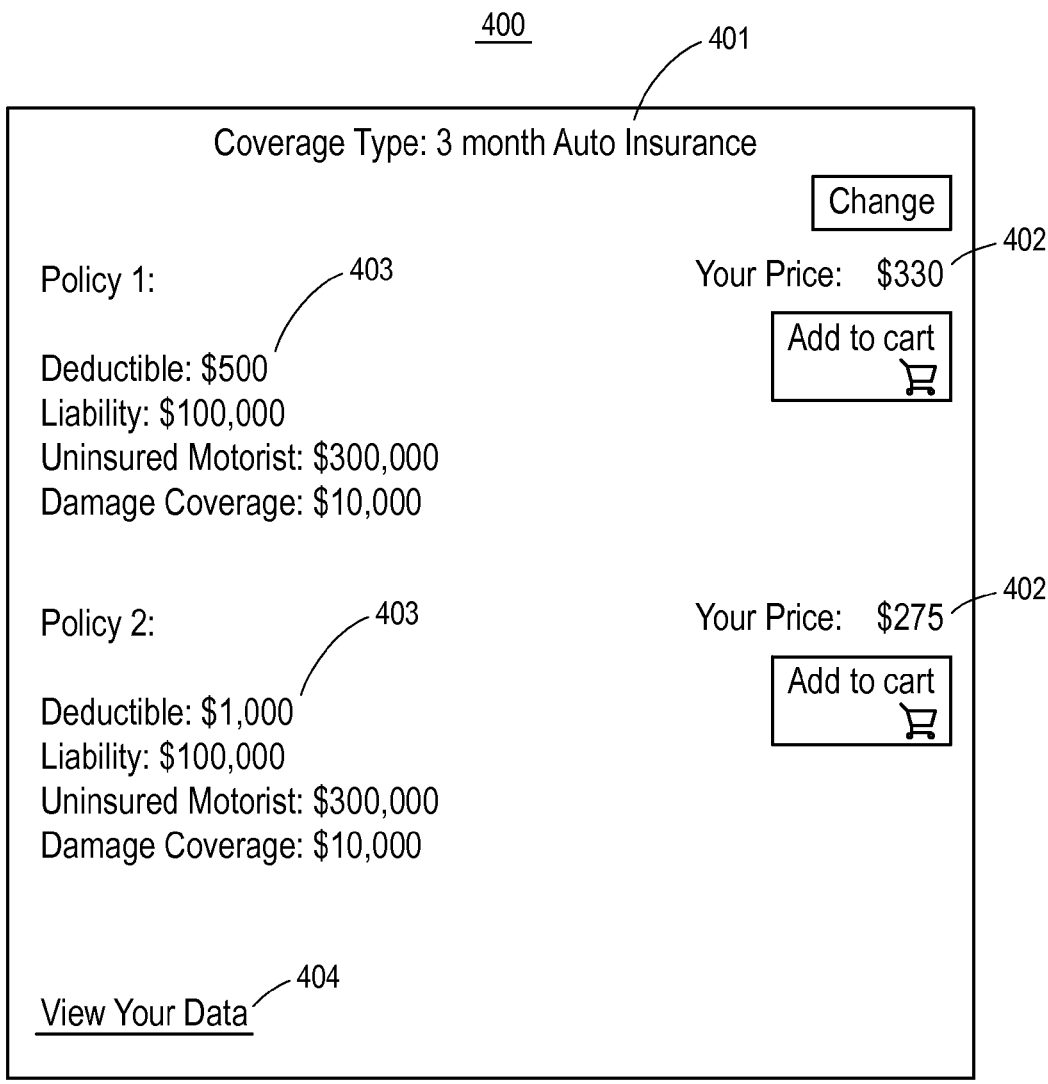
FIG. 4 is an illustration of an example user interface for displaying quotes.

At function 210, the system may execute instructions to send the created quotes 119a to be presented. The system may execute an instruction to have the dynamic policy module 112 send data including one or more quotes 119a and present the quotes 119a in a GUI 110 on a web browser 114 to a potential customer using a client 102 via communication link 106 (e.g., user interface 400 of FIG. 4). In some embodiments the interface 400 may include one or more presented quotes 119a. The presented quotes 119a may also include various information about the policy, such as duration (distance or time) 401, cost 402, deductible 403, reasons for the value price quote based on the gathered data 404, etc.

At function 212, the system 100 may execute instructions to receive a purchase transaction, via interface 400. Upon receiving a purchase transaction, the dynamic policy module 112 may execute instructions to begin tracking usage data to determine when the purchased policy expires, at function 214. The module 112 may determine that a policy has expired once a certain amount of time has passed since the purchase transaction. In another implementation, the module 112 may determine that a policy has expired based on the number of miles driven since the purchase transaction.

Once the module 112 determines that the policy has expired, the module may create new quotes 119a to present to a user for purchase. The module 112 would receive new usage data 128, tracked since the last purchase transaction, and use the information to create new quotes 119a.

Figure 5:
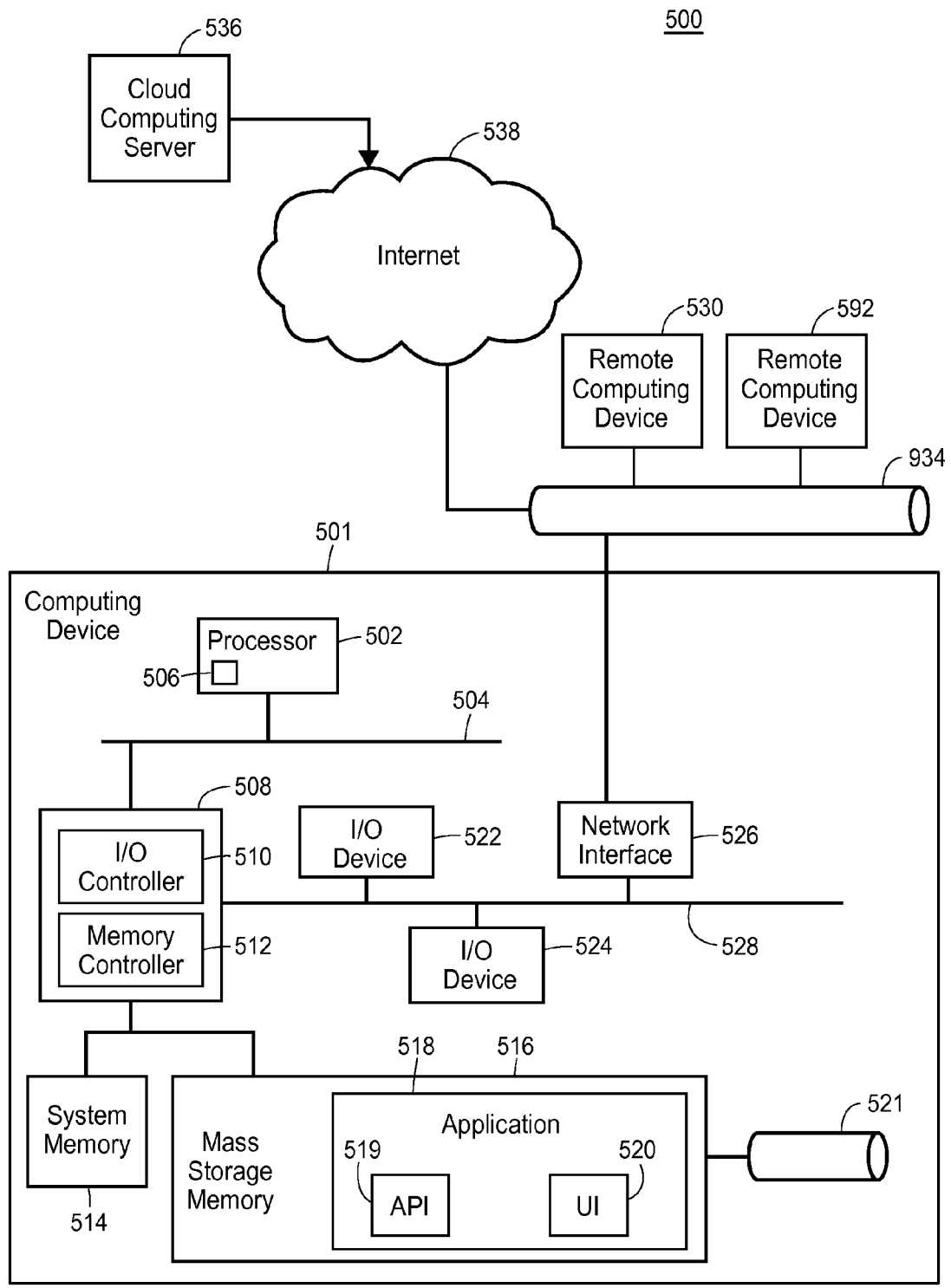
FIG. 5 illustrates a block diagram of a computer to implement the various user interfaces, methods, functions, etc., for dynamic auto insurance policy creation based on tracked usage data in accordance with the described embodiments.

FIG. 5 illustrates an exemplary computing environment for implementing the system 100 and method 200, as described herein. As shown in FIG. 5, the computing device 501 includes a processor 502 that is coupled to an interconnection bus 504. The processor 502 includes a register set or register space 506, which is depicted in FIG. 5 as being entirely on-chip, but which could alternatively be located entirely or partially off-chip and directly coupled to the processor 502 via dedicated electrical connections and/or via the interconnection bus 504. The processor 502 may be any suitable processor, processing unit or microprocessor. Although not shown in FIG. 5, the computing device 501 may be a multi-processor device and, thus, may include one or more additional processors that are identical or similar to the processor 502 and that are communicatively coupled to the interconnection bus 504.

The processor 502 of FIG. 5 is coupled to a chipset 508, which includes a memory controller 512 and a peripheral input/output (I/O) controller 510. As is well known, a chipset typically provides I/O and memory management functions as well as a plurality of general purpose and/or special purpose registers, timers, etc. that are accessible or used by one or more processors coupled to the chipset 508. The memory controller 512 performs functions that enable the processor 502 (or processors if there are multiple processors) to access a system memory 514 and a mass storage memory 516.

The system memory 514 may include any desired type of volatile and/or non-volatile memory such as, for example, static random access memory (SRAM), dynamic random access memory (DRAM), flash memory, read-only memory (ROM), etc. The mass storage memory 516 may include any desired type of mass storage device. For example, if the computing device 501 is used to implement a bundle tool application 518 having an API 519 (including functions and instructions as described by the method 300 of FIG. 3), and user interface 110 to receive user input, the mass storage memory 516 may include a hard disk drive, an optical drive, a tape storage device, a solid-state memory (a flash memory, a RAM memory, etc.), a magnetic memory (e.g., a hard drive), or any other memory suitable for mass storage. In one embodiment, non-transitory program functions, modules and routines (an application 518, an API 519, and the user interface 110, etc.) are stored in mass storage memory 516, loaded into system memory 514, and executed by a processor 502 or can be provided from computer program products that are stored in tangible computer-readable storage mediums (RAM, hard disk, optical/magnetic media, etc.). Mass storage 516 may also include a cache memory 521 storing application data, user profile data, and timestamp data corresponding to the application data, and other data for use by the application 518.

The peripheral I/O controller 510 performs functions that enable the processor 502 to communicate with peripheral input/output (I/O) devices 522 and 524, a network interface 526, via a peripheral I/O bus 528. The I/O devices 522 and 524 may be any desired type of I/O device such as a keyboard, a display (a liquid crystal display (LCD), a cathode ray tube (CRT) display, etc.), a navigation device (a mouse, a trackball, a capacitive touch pad, a joystick, etc.), etc. The I/O devices 522 and 524 may be used with the application 518 to provide a dynamic policy module 112 and web interface 400 as described in relation to the figures. The local network transceiver 528 may include support for Wi-Fi network, Bluetooth, Infrared, cellular, or other wireless data transmission protocols. In other embodiments, one element may simultaneously support each of the various wireless protocols employed by the computing device 501. For example, a software-defined radio may be able to support multiple protocols via downloadable instructions. In operation, the computing device 501 may be able to periodically poll for visible wireless network transmitters (both cellular and local network) on a periodic basis. Such polling may be possible even while normal wireless traffic is being supported on the computing device 501. The network interface 526 may be an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 512 and the I/O controller 510 are depicted in FIG. 5 as separate functional blocks within the chipset 508, the functions performed by these blocks may be integrated within a single integrated circuit or may be implemented using two or more separate integrated circuits. The system 500 may also implement the user interfaces 300 and 400 and dynamic policy module 112 on remote computing devices 530 and 532. The remote computing devices 530 and 532 may communicate with the computing device 501 over a network link 534. For example, the computing device 501 may receive usage data 128 tracked by an application executing on a remote computing device 530, 532. In some embodiments, the application 518 including the user interfaces 300 and 400 and module 112 may be retrieved by the computing device 501 from a cloud computing server 536 via the Internet 538. When using the cloud computing server 536, the retrieved application 518 may be programmatically linked with the computing device 501. The dynamic policy module application 518 may be a Java® applet executing within a Java® Virtual Machine (JVM) environment resident in the computing device 501 or the remote computing devices 530, 532. The application 518 may also be "plug-ins" adapted to execute in a web-browser located on the computing devices 501, 530, and 532. In some embodiments, the application 518 may communicate with backend components 540 such as the data system 104 via the Internet 538 or other type of network.

Using the system 100 and method 200 described herein, a dynamic policy module 112 and interfaces 300 and 400 coupled with the method 200 may implement a dynamic insurance creation methodology to better service, retain, and expand a business' potential customer base. By implementing the dynamic creation policies by the module 112, potential customers may have access to auto insurance coverage that is simple and quick. In an insurance business, this instant creation of policies may help cater to the needs of potential customers while also providing a new avenue for sales. For example, a potential customer in need of auto insurance coverage for a 50 mile trip may get a quote and purchase the coverage in minutes.

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 112, may include but is not limited to any combination of a LAN, a MAN, a WAN, a mobile, a wired or wireless network, a private network, or a virtual private network. Moreover, while only one client computing device is illustrated in FIG. 1 to simplify and clarify the description, it is understood that any number of client computers or display devices are supported and can be in communication with the data system 104.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, which may be one of an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or more processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors). These operations are accessible via a network (e.g., the Internet) and via one or more appropriate interfaces (e.g., application program interfaces (APIs)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "function" or an "algorithm" or a "routine" is a self-consistent sequence of operations or similar processing leading to a desired result. In this context, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Although the text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term " " is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computer system 100 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for creating and presenting insurance bundles through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method for creating insurance policy quotes for a potential customer based at least in part on tracked usage data corresponding to property to be insured by an insurance policy, the method comprising:
   providing for display, by one or more processors, a selectable option to track usage data corresponding to a potential customer vehicle;
   receiving, by the one or more processors, a selection to track usage data corresponding to the potential customer vehicle;
   tracking, by the one or more processors, usage data of the potential customer vehicle in response to the selection to track usage data;
   receiving, by the one or more processors, tracked usage data corresponding to the potential customer vehicle and other data corresponding to a potential customer;
   receiving, by the one or more processors, a coverage type for the one or more potential customer vehicles;
   receiving, by the one or more processors, a request for insurance policy quotes;
   creating, by the one or more processors, one or more insurance policy quotes in response to the received request for insurance policy quotes and based at least in part on the received tracked usage data and the received other data, wherein each policy quote corresponds to the received coverage type;
   receiving, by the one or more processors, a purchase transaction from the potential customer of an insurance policy from the one or more insurance policy quotes;
   tracking, by the one or more processors, usage data until the purchased insurance policy has expired, wherein the policy is determined to have expired when usage data has been tracked for a certain amount of time since the purchase transaction; and
   using, by the one or more processors, at least new tracked usage data to calculate new insurance policy quotes once the purchased insurance policy has expired.

2. The computer-implemented method of claim 1, wherein usage data comprises, for one or more potential customer vehicles, one or more of: a number of times a potential customer vehicle is turned on and off, a distance traveled by the potential customer vehicle, a number of times the potential customer enters or exits the potential customer vehicle, a total idle time for the potential customer vehicle, a total driving time for the potential customer vehicle, a number of times the potential customer vehicle enters and exits a particular location, a time of day which the potential customer vehicle is used, a frequency of driving events, a severity of driving events, an average miles per gallon the potential customer vehicle achieves, a carbon footprint the potential customer vehicle achieves, the potential customer vehicle location, a number or percent of times the vehicle surpasses a speed limit threshold, a travel route of the potential customer vehicle, a crime statistic along a travel route, a measure of traffic along the travel route, a weather event along the travel route, an accident report along the travel route, an average or percentiles of speed along the travel route, or a top speed along the travel route.

3. The computer-implemented of claim 1, wherein the received coverage type is based at least in part on one or more of time parameters, distance parameters, or different types of auto insurance coverage.

4. The computer-implemented method of claim 1, wherein receiving, using the one or more processors, the tracked usage data corresponding to the potential customer vehicle and the other data corresponding to the potential customer further comprises receiving, using the one or more processors, the tracked usage data corresponding to the potential customer vehicle and the other data corresponding to the potential customer through one or more databases of potential customer information.

5. The computer-implemented method of claim 1, further comprising tracking, by one or more processors, usage data with an On Board Diagnostic (OBD) device.

6. The computer implemented method of claim 1 further comprising:
- sending, by the one or more processors, a prompt to a mobile computing device of the potential customer, the prompt to take a photo of an odometer of the potential customer vehicle; and
- analyzing, by the one or more processors, the photo at one or more of the mobile computing device or a backend server to determine a set of numbers from the photo;
- wherein the set of numbers indicates a mileage of the vehicle.

7. The computer implemented method of claim 6, wherein sending, by the one or more processors, the prompt to the mobile computing device of the potential customer, the prompt to take the photo of the odometer of the potential customer vehicle includes sending at periodic intervals, by the one or more processors, the prompt to the mobile computing device of the potential customer, the prompt to take the photo of the odometer of the potential customer vehicle.

8. The computer implemented method of claim 1, wherein a smart phone of the potential customer tracks the usage data.

9. The computer implemented method of claim 1, wherein one or more of a smart phone of the potential customer or a vehicle sensor tracks the usage data.

10. The computer implemented method of claim 2, wherein receiving, by the one or more processors, the selection to track usage data corresponding to the potential customer vehicle includes receiving, by the one or more processors, the selection to track a subset of the usage data corresponding to the potential customer vehicle.

11. A dynamic insurance policy system configured to create insurance policy quotes for a potential customer based at least in part on tracked usage data corresponding to one or more vehicles to be insured by an insurance policy, the system comprising:
- a data system server including one or more processors and one or more memories, the memories including instructions executed on the one or more processors to:
  - provide for display, a selectable option to track usage data corresponding to a potential customer vehicle;
  - receive a selection to track usage data corresponding to the potential customer vehicle;
  - track usage data of one or more potential customer vehicles in response to the selection to track usage data;
  - receive tracked usage data corresponding to the one or more potential customer vehicles and other data corresponding to a potential customer;
  - receive at least one coverage type for the one or more potential customer's vehicles;
  - receive a request for insurance policy quotes;
  - create one or more insurance policy quotes in response to the received request for insurance policy quotes and based at least in part on the received tracked usage data and the received other data, wherein each policy quote corresponds to the received coverage type;
  - receive a purchase transaction from the potential customer of an insurance policy from the one or more insurance policy quotes;
  - track usage data until the purchased insurance policy has expired, wherein the policy is determined to have expired when usage data has been tracked for a certain amount of time since the purchase transaction; and
  - use at least new tracked usage data to calculate new insurance policy quotes once the purchased insurance policy has expired.

12. The computer system of claim 11, wherein usage data comprises, for one or more potential customer vehicles, one or more of: a number of times a potential customer vehicle is turned on and off, a distance traveled by the potential customer vehicle, a number of times the potential customer enters or exits the potential customer vehicle, a total idle time for the potential customer vehicle, a total driving time for the potential customer vehicle, a number of times the potential customer vehicle enters and exits a particular location, a time of day which the potential customer vehicle is used, a frequency of driving events, a severity of driving events, an average miles per gallon the potential customer vehicle achieves, a carbon footprint the potential customer vehicle achieves, the potential customer vehicle location, a number or percent of times the vehicle surpasses a speed limit threshold, a travel route of the potential customer vehicle, a crime statistic along a travel route, a measure of traffic along the travel route, a weather event along the travel route, an accident report along the travel route, an average or percentiles of speed along the travel route, or a top speed along the travel route.

13. The computer system of claim 11, wherein the received coverage type is based at least in part on one or more of a time parameter, a distance parameter, or a type of auto insurance coverage.

14. The computer system of claim 11, wherein tracked usage data and other data is further received through one or more databases of potential customer information.

15. The computer system of claim 11, wherein an On Board Diagnostics (OBD) device tracks usage data.

16. The computer system of claim 11, further comprising:
- an instruction to send a prompt to a mobile computing device of the potential customer to take a photo of an odometer of the potential customer vehicle; and
- an instruction to analyze the photo at one or more of the mobile computing device that took the photo or a backend server to determine a set of numbers from the photo;
- wherein the set of numbers indicates a mileage of the vehicle.

17. The computer system of claim 16, wherein the instruction to send the prompt to the mobile computing device of the potential customer, the prompt to take the photo of the odometer of the potential customer vehicle includes an instruction to send, at periodic intervals, the prompt to the mobile computing device of the potential customer, the prompt to take the photo of the odometer of the potential customer vehicle.

18. The computer system of claim 11, wherein a smart phone of the potential customer tracks the usage data.

19. The computer implemented method of claim 11, wherein one or more of a smart phone of the potential customer or a vehicle sensor tracks the usage data.

20. The computer implemented method of claim 12, wherein receiving, by the one or more processors, the selection to track usage data corresponding to the potential customer vehicle includes receiving, by the one or more processors, the selection to track a subset of the usage data corresponding to the potential customer vehicle.

21. A tangible, non-transitory computer-readable medium including non-transitory computer readable instructions stored thereon for creating insurance policy quotes for a potential customer based at least in part on tracked usage data corresponding to one or more vehicles to be insured by an insurance policy, the instructions to:
- provide for display, a selectable option to track usage data corresponding to a potential customer vehicle;
- receive a selection to track usage data corresponding to the potential customer vehicle;

track usage data of one or more potential customer vehicles in response to the selection to track usage data;

receive tracked usage data corresponding to the one or more potential customer vehicles and other data corresponding to a potential customer;

receive a coverage type for the one or more potential customer vehicles;

receive a request for insurance policy quotes;

create one or more insurance policy quotes in response to the received request for insurance policy quotes and based at least in part on the received usage data and the received other data, wherein each policy quote corresponds to the received coverage type;

receive a purchase transaction from the potential customer of an insurance policy from the one or more insurance policy quotes;

track usage data until the purchased insurance policy has expired, wherein the policy is determined to have expired when usage data has been tracked for a certain amount of time since the purchase transaction; and use at least new tracked usage data to calculate new insurance policy quotes once the purchased insurance policy has expired.

22. The tangible, non-transitory computer-readable medium of claim 21, wherein usage data comprises one or more of: a number of times a potential customer vehicle is turned on and off, a distance traveled by the potential customer vehicle, a number of times the potential customer enters or exits the potential customer vehicle, a total idle time for the potential customer vehicle, a total driving time for the potential customer vehicle, a number of times the potential customer vehicle enters and exits a particular location, a time of day which the potential customer vehicle is used, a frequency of driving events, a severity of driving events, an average miles per gallon the potential customer vehicle achieves, an carbon footprint the potential customer vehicle achieves, the potential customer vehicle location, a number or percent of times the vehicle surpasses a speed limit threshold, a travel route of the potential customer vehicle, a crime statistic along a travel route, a measure of traffic along the travel route, a weather event along the travel route, an accident report along the travel route, an average or percentiles of speed along the travel route, or a top speed along the travel route.

23. The tangible, non-transitory computer-readable medium of claim 21, wherein the received coverage type is based at least in part on one or more of a time parameter, a distance parameter, or a type of auto insurance coverage.

24. The tangible, non-transitory computer-readable medium of claim 21, wherein the instruction to receive tracked usage and other data comprises further instructions to receive the tracked usage and other data through one or more databases of potential customer information.

25. The tangible, non-transitory computer-readable medium of claim 21, wherein an On Board Diagnostic (OBD) device tracks usage data.

26. The tangible, non-transitory computer-readable medium of claim 21, further comprising:

an instruction to send a prompt to a mobile computing device of the potential customer to take a photo of an odometer of the potential customer vehicle; and an instruction to analyze the photo at one or more of the mobile computing device that took the photo or a back-end server to determine a set of numbers from the photo;

wherein the set of numbers indicates a mileage of the vehicle.

27. The tangible, non-transitory computer-readable medium of claim 26, wherein the instruction to send the prompt to the mobile computing device of the potential customer, the prompt to take the photo of the odometer of the potential customer vehicle includes an instruction to send, at periodic intervals, the prompt to the mobile computing device of the potential customer, the prompt to take the photo of the odometer of the potential customer vehicle.

* * * * *